United States Patent
Feller

(10) Patent No.: US 8,578,787 B1
(45) Date of Patent: Nov. 12, 2013

(54) VORTEX FLOW METER WITH SAMPLING RATE CONTROL

(75) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 0 days.

(21) Appl. No.: 13/488,491

(22) Filed: Jun. 5, 2012

Related U.S. Application Data

(63) Continuation-in-part of application No. 13/235,696, filed on Sep. 19, 2011, now Pat. No. 8,408,071.

(51) Int. Cl.
*G01F 1/32* (2006.01)

(52) U.S. Cl.
USPC .......................................... 73/861.23

(58) Field of Classification Search
USPC .............................. 73/861.19, 861.22, 861.23
See application file for complete search history.

(56) References Cited

U.S. PATENT DOCUMENTS

| | | | | |
|---|---|---|---|---|
| 4,815,324 A | * | 3/1989 | Tada et al. | 73/861.22 |
| 5,005,425 A | * | 4/1991 | Ohmae | 73/861.22 |
| 5,503,035 A | * | 4/1996 | Itoh et al. | 73/861.23 |

* cited by examiner

*Primary Examiner* — Jewel V Thompson
(74) *Attorney, Agent, or Firm* — David Kiewit

(57) ABSTRACT

Vortex-shedding flow meters are operated at a sampling frequency high enough to detect each vortex multiple times. Using a fixed sampling frequency high enough for a maximum rate of vortex generation oversamples the vortices generated at low flow rates. Adjusting the sampling rate to accord with the flow rate being measured significantly reduces electric power consumption.

11 Claims, 4 Drawing Sheets

VORTEX FLOW METER WITH SAMPLING RATE CONTROL

This application is a continuation-in-part of the inventor's U.S. patent application Ser. No. 13/235,696, filed on Sep. 19, 2011 and issued on Apr. 2, 2013 as U.S. Pat. No. 8,408,071.

BACKGROUND OF THE INVENTION

This document generally relates to measuring fluid flow by measuring vibrations or acoustic energy generated by a vortex shedding structure or by a fluidic oscillator. More specifically, it relates to approaches for reducing the electrical power consumption and extending the turndown ratio of flow meters providing an electrical frequency signal representative of fluid flow rate.

BACKGROUND INFORMATION

Conventional vortex-shedding flow meters typically have a turndown ratio of no more than 15:1. Some such flow meters may use ultrasonic sensors to detect vortices and acquire signals at a rate much greater than the greatest expected rate of vortex generation so that each vortex can be interrogated multiple times.

The electric power required to operate vortex-shedding flow measurement circuitry increases with the sample rate, which is normally set to a constant value high enough to detect maximum flow. Hence, conventional vortex-shedding flow meters consume excess power at all flow rates other than the rated maximum.

BRIEF SUMMARY OF THE INVENTION

The inventor's parent application teaches vortex-shedding flow meters having a structure which allows for measurement of lower flow rates. When the measurement circuitry is operated at a constant clock rate, this exacerbates the shortcoming of using excess power at low flow rate. One of the aspects of the present invention is that it provides a vortex-shedding flowmeter having electrical power consumption responsive to the flow rate being measured. This is expected to be of considerable utility in situations (e.g., residential water meters) in which extended periods of no-flow and low power consumption are interspersed by relatively short periods of high flow.

Another aspect of the invention is that it provides an improved fluid flow sensor of a sort in which a structural component of the sensor induces an oscillating flow component transverse to a flow direction and in which a circuit, operating at a selected clock frequency, generates an electric output signal responsive to the rate of oscillation. A preferred improvement to flow sensors of this sort comprises electrical feedback circuitry operable to alter the sample frequency responsive to the frequency of the output signal. Another preferred improvement comprises changing the gain of an output amplifier responsive to the frequency of the output signal in order to minimize amplifier saturation and power consumption and to extend a turndown range of the instrument.

Yet another aspect of the invention is that it provides an apparatus for measuring a rate of fluid flow. This apparatus comprises a flow obstruction and measurement circuitry. The flow obstruction produces oscillating transverse flow components representative of the fluid flow rate when fluid is flowing past it. The measurement circuitry is operable at a selected sampling rate to detect the oscillating transverse flow components and to produce an output signal representative of the fluid flow rate. In a preferred embodiment, the apparatus comprises feedback circuitry operable to change the selected sampling rate responsive to the output signal. In another preferred embodiment, the apparatus comprises circuitry for controlling gain of an output amplifier responsive to the output frequency.

A further aspect of the invention is that it provides a method of reducing energy consumption of a fluid flow meter of the sort in which a flow obstruction produces an oscillating transverse flow component representative of the fluid flow rate when fluid is flowing past the obstruction. The method involves operating measurement circuitry at a selected sampling rate to detect the oscillating transverse flow component and to produce an output signal representative of the fluid flow rate; and then controlling the selected sampling rate to be sufficiently higher than the oscillating transverse flow component.

Additionally, a vortex signal frequency can be used to control the magnitude of the signals in the supporting electronics. It is noted that the magnitude of the detected ultrasonic signals representing the vortex frequencies can vary over a very wide range with flow rate, for example several hundred to one. This is due to the corresponding wide range of fluid velocities produced by the vortices. By maintaining these vortex signal levels more constant, distortion and noise is minimized, and power consumption is reduced by minimizing amplifier overdrive.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

Figure 1:
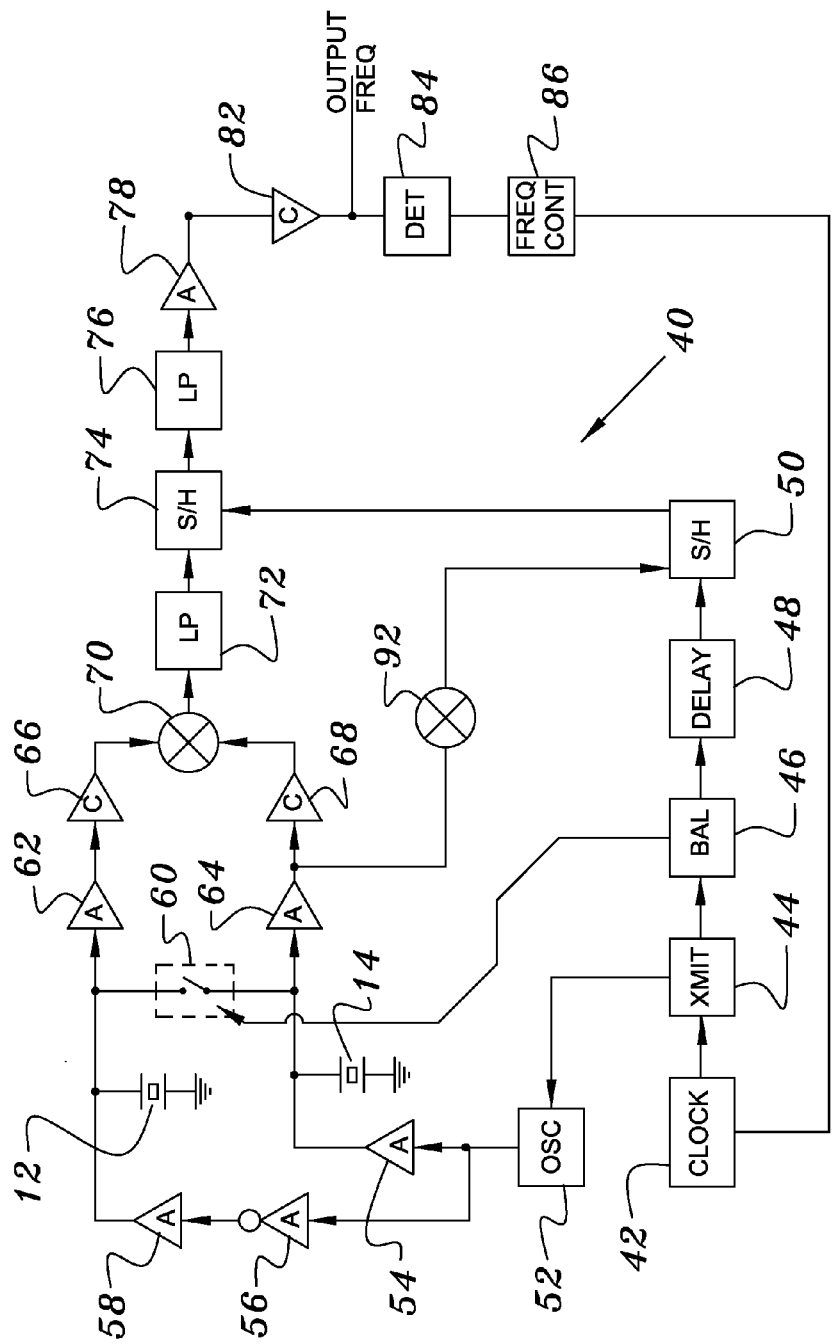
FIG. 1 is a schematic block diagram of a low power flow transducer in accordance with a first embodiment of the invention.

In his parent patent application U.S. Ser. No. 13/235,696, the inventor presents a simplified block diagram 40 of a preferred electronic circuit suitable for phase-detecting modulations produced by vortices. The circuit presented in U.S. Ser. No. 13/235,696 differs from exemplar circuits discussed below in that it lacks circuitry for controlling the clock rate. In one of the exemplar inventive circuits, depicted in FIG. 1, this functionality is achieved by adding a comparator 82, a detector 84 and a frequency controller 86 to the circuit of U.S. Ser. No. 13/235,696. In another example, depicted in FIG. 2, a comparator 82 and a frequency converter 88 are added to the circuit of U.S. Ser. No. 13/235,696 and a fixed rate clock 42 is removed. The use of clock rate control will be discussed herein after a recapitulation of the basic phase-detecting circuit 40.

When the circuit 40 is used with a flowmeter having a 1.049" bore for measuring the flow of water at room temperature the clock 42 may provide trigger pulses selected to be spaced 100 microseconds apart. The clock pulses are input to a transmit timer 44 which enables the carrier oscillator 52 and the transducer amplifiers 54 and 58. This energizes both transducers 12, 14 simultaneously for a period that is less than the acoustic transit time across the bore (e.g., eighteen microseconds). An inverter 56 inverts the signal provided to one of the transducers 12 through the transducer amplifier 58, so that the two transducers transmit their signals 180 degrees out of phase. After the enabled pulse has been completed, the outputs of the transducer amplifiers 54, 58 assume a high impedance state to avoid loading the transducers during signal reception. The reader will note that alternative circuit configurations are possible and include, without limit, providing each of the transducers with a SPDT T/R switch (not shown) to connect first to their respective transmitting amplifiers when transmitting and then to their respective receiving amplifiers when receiving.

The trailing edge of a pulse from the transmit timer 44 triggers a balance timer 46 which closes a switch 60 to short the two transducers together for a brief time (e.g., two microseconds) in order to quickly dissipate the energy remaining from the transmitting operation before receiving the acoustic signals. This enables the circuit to begin receiving promptly after transmission so that the desired acoustic signals can be received with minimal distortion before receiving signals that have been corrupted by reflections that have traveled over longer path lengths.

In a preferred embodiment the carrier signals energizing the two transducers are 180 degrees out of phase. The detection sensitivity of the modulation is relatively large because a phase change signal from vortex modulation in one direction is compared to that in the opposite direction, and the difference in phase between the two signals ultimately produces the output signal. In other embodiments the transmitted signals may be in phase or at some intermediate angle with respect to each other depending on the type of phase detector employed and the phase shift in the received signal paths. The transmitting and receiving functions may also alternate with the received signals being phase or time compared against a reference oscillator as is often done in ultrasonic transit-time flow meters.

The received signals are amplified by respective receiving amplifiers 62, 64 and are squared up by respective comparators 66, 68 before entering a phase detector 70, which may be a SR flip-flop. Either the transmitting phase difference between the transducers and/or that between the received signal paths is adjusted to operate the phase detector 70 within its nominally linear range. With some types of detectors the comparators may be unnecessary and the amplifiers may be conventionally gain controlled to maintain their output signal levels relatively constant or within their proper operating range, and to avoid excess power consumption. The output from the phase detector 70 is filtered by a filter circuit 72 to remove carrier components and is then input to a sample and hold circuit 74. The sample and hold 74 is enabled, after a delay controlled by a delay timer 48, by the sample and hold timer 50. In an alternate preferred embodiment the sample and hold timer 50 is triggered by an output from a suitable detector 92 that amplitude detects the output from one of the amplifiers 62, 64. The output from the sample and hold 74 passes through a low pass filter 76 to remove clock frequency components and then enters an output amplifier 78 and comparator 82 to provide a frequency output representative of flow rate.

FIG. 1 conceptually depicts a first approach to providing a clock rate control to the circuit 40. In this example a comparator 82, detector 84 and frequency controller 86 for the clock 42 are added to the basic circuit 40. The comparator 82 squares up the signal representative of flow rate, which is typically sinusoidal, and immediately provides the detector 84 with a large magnitude signal that is detected and used by the frequency controller 86 to regulate the clock frequency.

Figure 2:
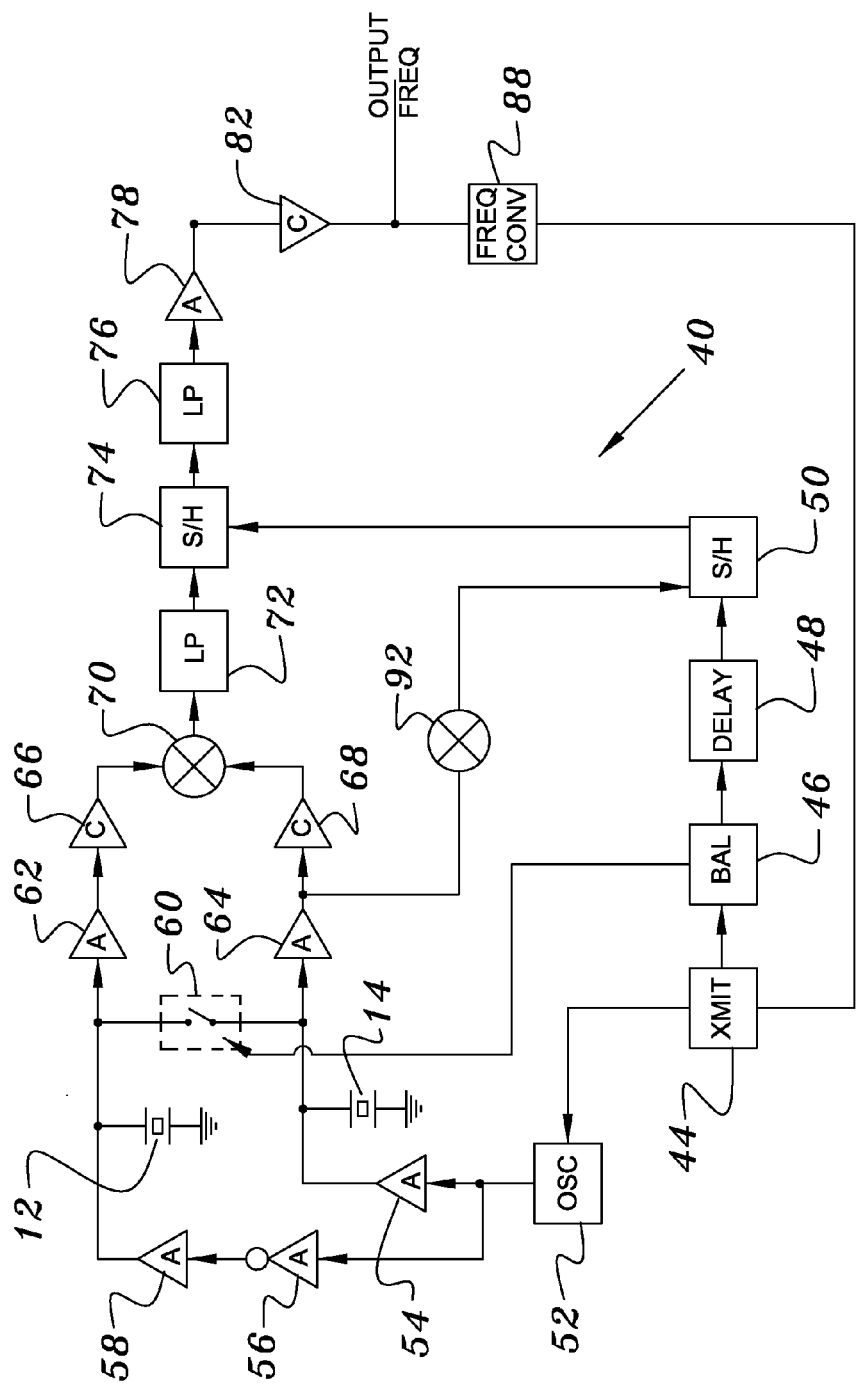
FIG. 2 is a schematic block diagram of a low power flow transducer in accordance with a second embodiment of the invention.

FIG. 2 conceptually depicts a second approach to providing clock rate control. In this arrangement, the output from the comparator 82 is provided to a frequency converter 88 which then directly provides clock pulses.

Figure 3:
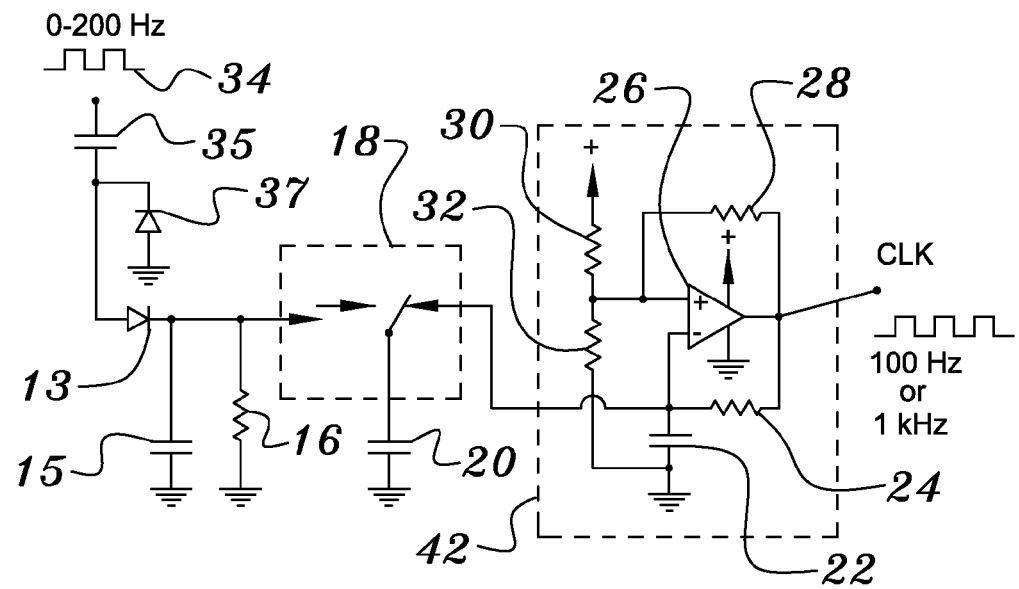
FIG. 3 is a schematic diagram of a circuit providing the clock frequency control functionality generally depicted in FIG. 1.

FIG. 3 provides a simplified schematic diagram of an exemplar circuit providing detection and frequency control functionality. In this circuit a square wave signal 34 from a comparator 82 passes through a capacitor 35, is then level-shifted by a diode 37, and rectified by another diode 13 and filtered by the low pass filter consisting of a capacitor 15 and resistor 16, and activates a relay 18. The relay contacts, when closed, connect a doze timing capacitor 20 across the measuring timing capacitor 22 of the clock oscillator 43 so that when the relay 18 switches, the contacts open to disconnect the doze timing capacitor 20, so that the clock operates at a higher frequency. Resistors 24, 28 provide feedback and timing while other resistors 30, 32 set the operating point of the comparator 26.

In an application example using a small (nominal ¾") flow meter operable up to twenty gallons per minute, a vortex frequency of two to two hundred Hz can be measured. When dozing, the clock doze frequency is selected to be 100 Hz. When a flow rate above ½ gpm is present, the relay control voltage is sufficient to open the relay contact so that the clock operates at 1 kHz for making the higher flow rate measurements. In one implementation example, the meter operating current varied between 30 and 200 microamperes. The clock rates could be somewhat lower with additional filtering of the flow rate signal. This method is ideal for applications where the flow rate range is generally within narrow limits and the maximum clock rate can be adjusted for a particular installation to minimize power consumption.

Figure 4:
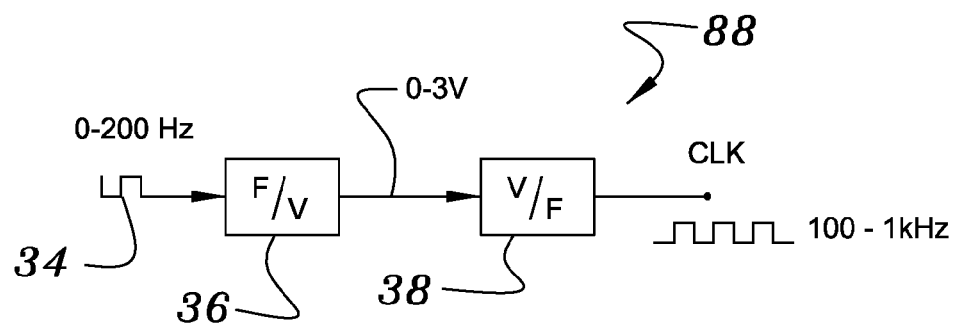
FIG. 4 is a schematic diagram of a circuit providing the clock frequency control functionality generally depicted in FIG. 2.

FIG. 4 provides a simplified block diagram of circuitry providing the frequency conversion functionality indicated in FIG. 2. In this case the clock oscillator 42 is actually replaced by a combination of frequency to voltage converter 36 and voltage to frequency converter 38 which then supplies the clock pulses to the transmitter 44. In an example of the operation of this circuit, a 0 to 200 Hz signal that enters the voltage to frequency converter 36 is converted to a DC voltage level of 0 to 3 volts which then controls the frequency of the voltage to frequency converter 38 to provide a 100 Hz to 1 KHz output clock signal. The 100 Hz is a built-in doze offset used to maintain the ability to detect fluid flow down to a zero flow rate. The ability of this arrangement to respond over a wide range of flow rates makes it very desirable for applications such as domestic water consumption.

Although the clock rate functionality described above is presented in terms of an analog hardware realization, one skilled in the art will recognize that the same functionality can be achieved by equivalent digital processing.

Figure 5:
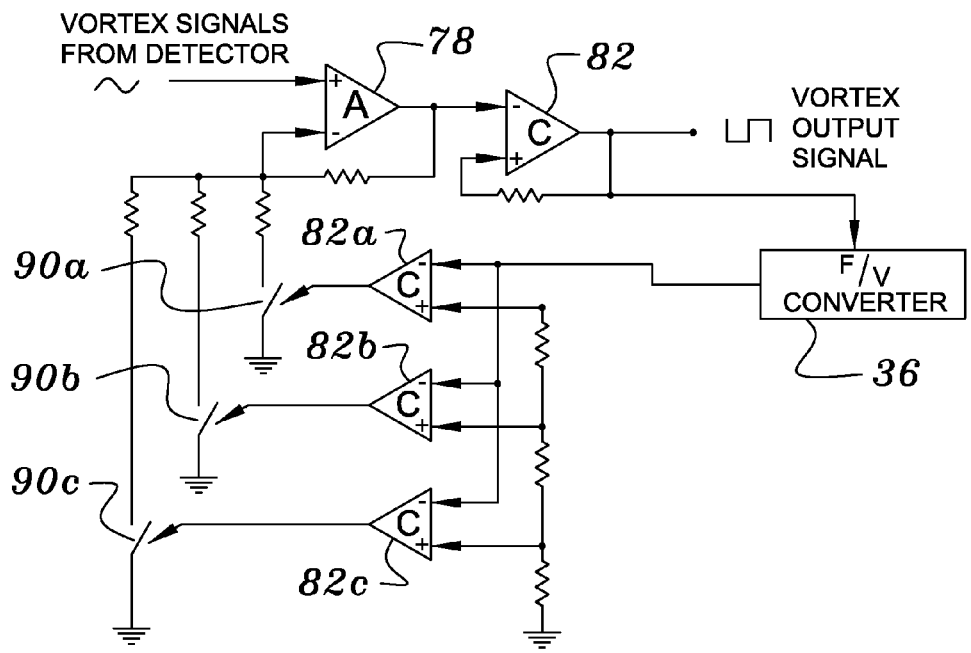
FIG. 5 is a schematic diagram of a first embodiment of a circuit for adjusting the output amplifier gain responsive to an output frequency signal.
Figure 6:
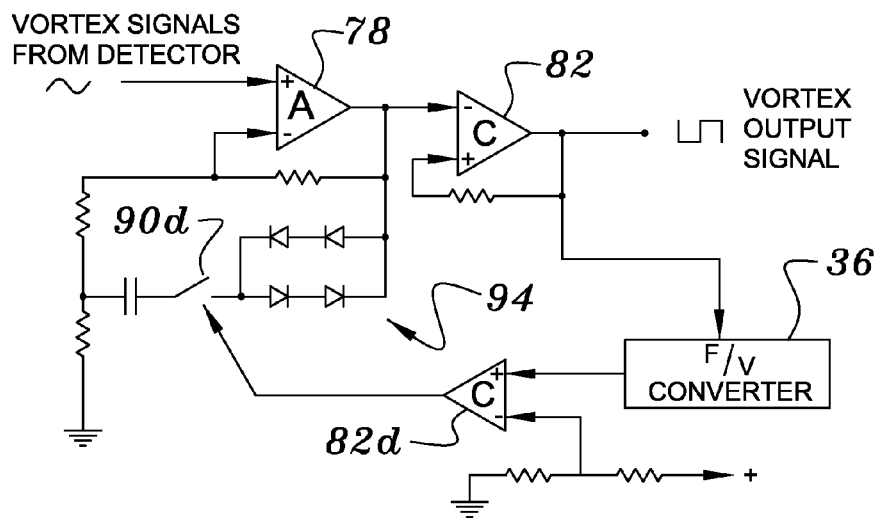
FIG. 6 is a schematic diagram of a second embodiment of a circuit for adjusting the output amplifier gain responsive to an output frequency signal.

Turning now to FIGS. 5 and 6, one finds preferred approaches to using a vortex signal frequency to control the magnitude of the signals after they have been detected by the detector 70 so that an amplitude of the output signal remains within a selected range regardless of the output signal frequency. This is preferably done not by detecting the carrier signal levels typically employed in conventional automatic gain control (AGC) circuits because the phase modulation being used does not directly produce corresponding level changes for such control. Instead, the frequency of the vortices is used to control signal levels according to a preset program. While the magnitude of the vortex signals could also be used to provide the gain control it is less advantageous to use because the vortex frequency can be as low as 1 Hz or so. Hence, the detection and filtering would be a relatively lengthy and cumbersome process compared to frequency detection. Furthermore, presetting the gain steps eliminates the common negative feedback loop and attendant instability and component issues because of the low vortex frequencies desired to be detected.

A frequency to voltage converter 36 produces a DC level corresponding to the frequency of the vortices and uses that voltage to control the gain of a signal amplifier 78 or the attenuation factor of an attenuator. The control can be enabled in a stepped manner through one or more switches or in a variable way for example by controlling the bias on a FET. The DC level output from the frequency to voltage converter that is used to control the cycle frequency for power reduction disclosed earlier may also be used for the magnitude control function.

In a preferred embodiment, the output signal of the flow meter is from a comparator 82 producing a square wave with a frequency corresponding to fluid flow rate. The frequency is converted into a DC level which is then used to control the gain of the amplifier providing the signal to the comparator. The amplifier gain is varied according to frequency, it being noted that the magnitude of the square wave is maintained constant and negative feedback is not employed.

In FIG. 5, low level signals representative of vortex frequency signals enter the amplifier 78. This amplifier 78 feeds the comparator 82 which provides the square wave output signal from the meter. The square wave also enters a frequency to voltage converter 36 which produces a DC level responsive to the frequency of its input signal. That DC level is voltage divided to provide different outputs to three comparators 82a, 82b, 82c arranged to activate respectively associated switches 90a, 90b, 90c at three different levels. The comparators 82a-c are configured to invert so that a rising input signal opens the associated switches 90a-c. The switches 90a-c control the feedback gain of the amplifier so that starting from a very low vortex frequency with correspondingly low vortex signal magnitude, all of the switches are closed and the amplifier amplifies the vortex frequency signal with maximum gain. As the frequency increases, one switch opens, then a second, and finally the third. Four gain factors can then be enabled to set the signal levels to the input of the output comparator. The switches 90a-c may also be logically selected using binary gain steps, for example 1, 2, 4 and 8 to provide intermediate gain steps for finer gain control. The output comparator incorporates positive feedback with wide enough switch levels for hysteresis so that its output is always free from the influences of noise on its input.

Turning now to FIG. 6, one finds a vortex signal amplifier 78 having back-to-back diodes 94 in its feedback loop to control gain and limit signal magnitude. When the vortex signal frequency into the amplifier 78 is low, the switch 90d stays open and the amplifier gain is high. When the frequency to voltage converter 36 receives a signal indicative of a higher vortex frequency, it provides a sufficient DC level to the comparator 82d to enable the switch 90d to close the negative feedback loop comprising the diodes 94. Because of the diode voltage drop, the amplifier 78 acts as a limiter and provides a relatively stable signal amplitude to the comparator 82 over a wide range of input signals and minimizes the effects of low frequency signals resulting from fluid turbulence which can momentarily prevent the comparator 82 from responding at the vortex frequency and thereby produce measurement error.

Other types of flow meters, such as fluidic oscillators, also measure fluid flow by measuring fluid oscillations that are generally transverse to a direction of fluid flow. The skilled reader will appreciate that the variable clock rate teachings of the invention are applicable to these other approaches in addition to its use with vortex-shedding flow meters.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. In a fluid flow sensor comprising structural elements capable of inducing an oscillating flow component having a frequency representative of a rate of flow when the fluid is flowing along a flow direction, the oscillating flow component transverse to the fluid flow direction; the sensor further comprising electronic measurement circuitry operable at a selected sampling rate to detect the frequency of the oscillating flow component; an improvement comprising control circuitry operable to alter the sampling rate responsive to the frequency of the oscillating flow component.

2. The fluid flow sensor of claim 1 comprising additional circuitry operable to alter a gain of an output amplifier responsive to the frequency of the oscillating flow component.

3. The fluid flow sensor of claim 1 wherein the control circuitry is operable to provide a minimum selected sampling rate when the rate of flow is zero and a maximum selected sampling rate when the rate of flow is a maximum.

4. A method of measuring a rate of fluid flow along a flow direction, the method comprising the sequentially executed steps of:
   generating fluid oscillations transverse to the flow direction and having an oscillation rate characteristic of the rate of fluid flow;
   detecting the oscillation rate by means of a measurement circuit operating responsive to control pulses generated at a selected control pulse rate greater than the oscillation rate;
   providing, by means of the measurement circuit, an output signal having an output signal frequency representative of the rate of flow; and
   changing the selected control pulse rate responsive to the output signal frequency.

5. The method of claim 4 further comprising a step of changing a gain of an output amplifier responsive to the output signal frequency.

6. The method of claim 4 wherein the fluid oscillations comprise vortices generated by a flow obstruction extending transverse to the flow direction.

7. The method of claim 4 wherein the measurement circuitry comprises at least one ultrasonic transducer.

8. The method of claim 4 wherein the step of changing the control pulse rate comprises raising the control pulse rate when the output signal frequency increases and lowering the control pulse rate when the output signal decreases.

9. An apparatus for measuring a fluid flow rate of fluid flowing along a flow direction, the apparatus comprising:
   a flow obstruction producing oscillating flow components transverse to the flow direction at a rate representative of the fluid flow rate when fluid is flowing past the obstruction;
   measurement circuitry operable at a selected sampling rate to detect the oscillating transverse flow components and to produce therefrom an output signal having a frequency representative of the fluid flow rate; and
   control circuitry operable to change the selected sampling rate responsive to the frequency of the output signal.

10. The apparatus of claim 9 comprising additional circuitry operable to alter a gain of an output amplifier responsive to the frequency of the output signal.

11. The apparatus of claim 9 wherein the flow obstruction comprises an elongated body extending transverse to the flow direction and wherein the oscillating flow components are derived from vortices shed by the elongated body.

\* \* \* \* \*